United States Patent
Nikitenko et al.

(10) Patent No.: US 11,763,514 B1
(45) Date of Patent: *Sep. 19, 2023

(54) HARDWARE-ASSISTED EMULATION OF GRAPHICS PIPELINE

(71) Applicant: PARALLELS INTERNATIONAL GmbH, Schaffhausen (CH)

(72) Inventors: Evgeny Nikitenko, Moscow (RU); Alexey Ivanov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,543

(22) Filed: Sep. 6, 2022

Related U.S. Application Data

(63) Continuation of application No. 17/322,051, filed on May 17, 2021, now Pat. No. 11,450,056, which is a continuation of application No. 16/800,656, filed on Feb. 25, 2020, now Pat. No. 11,055,896.

(51) Int. Cl.
*G06T 1/20* (2006.01)
*G06T 15/00* (2011.01)
*G06T 17/20* (2006.01)

(52) U.S. Cl.
CPC .............. *G06T 15/005* (2013.01); *G06T 1/20* (2013.01); *G06T 17/20* (2013.01)

(58) Field of Classification Search
CPC ........... G06T 1/20; G06T 1/60; G06T 15/005; G06T 17/20

USPC ......................................... 345/423, 506, 530
See application file for complete search history.

(56) References Cited

U.S. PATENT DOCUMENTS

| | | | |
|---|---|---|---|
| 11,010,862 B1* | 5/2021 | Nijasure | G06T 15/005 |
| 2007/0091088 A1* | 4/2007 | Jiao | G06T 15/005 |
| | | | 345/426 |
| 2010/0079454 A1* | 4/2010 | Legakis | G06F 9/3851 |
| | | | 345/423 |

(Continued)

OTHER PUBLICATIONS

"Metal Shading Language Specification, Version 2.2", https://developer.apple.com/metal/Metal-Shading-Language-Specification.pdf, 201 pages, Sep. 14, 2019 (Retrieved Sep. 2, 2022).

(Continued)

*Primary Examiner* — Jacinta M Crawford
(74) *Attorney, Agent, or Firm* — Rosenberg, Klein & Lee

(57) ABSTRACT

An example method of hardware-assisted graphics pipeline emulation comprises: computing, based on an input set of graphic primitives, a set of tessellation factors; computing, based on the input set of graphic primitives, a set of points specifying a plurality of patches; computing, based on the set of points, a tessellation count buffer; generating, based on the set of points and the tessellation count buffer, a tessellation offset buffer; performing, using the tessellation offset buffer, a tessellation setup stage; performing, by a graphics processing unit (GPU), a tessellation stage based on the set of tessellation factors, wherein the tessellation stage generates a plurality of output points corresponding to one or more patches of the plurality of patches; and computing, by a domain shader stage, a plurality of vertex positions defined by the plurality of output points.

21 Claims, 5 Drawing Sheets

(56) References Cited

U.S. PATENT DOCUMENTS

| | | |
|---|---|---|
| 2011/0069065 A1* | 3/2011 | Hiwada ................ G06T 15/005 345/423 |
| 2011/0128285 A1 | 6/2011 | Gong |
| 2016/0358376 A1 | 12/2016 | Lacey et al. |
| 2017/0358132 A1 | 12/2017 | Munshi et al. |
| 2019/0311535 A1 | 10/2019 | Lacey |
| 2019/0311536 A1 | 10/2019 | Lacey et al. |
| 2020/0020156 A1* | 1/2020 | Howson ................ G06T 15/005 |

OTHER PUBLICATIONS

"Tessellation Stages", https://docs.microsoft.com/en-us/windows/win32/direct3d11/direct3d-11-advanced-stages-tessellation, 8 pages, May 31, 2018 (Retrieved Aug. 19, 2021).

* cited by examiner

HARDWARE-ASSISTED EMULATION OF GRAPHICS PIPELINE

CROSS-REFERENCE TO RELATED APPLICATIONS

This application claims the benefit of priority as a continuation of U.S. patent application Ser. No. 17/332,051 filed May 17, 2021; which itself claims the benefit of priority as a continuation of U.S. patent application Ser. No. 16/800,656 filed Feb. 25, 2020, which has issued as U.S. Pat. No. 11,055,896; the entire contents of each being incorporated herein by reference.

TECHNICAL FIELD

The present disclosure is generally related to virtualization, and is specifically related to graphics pipeline emulation.

BACKGROUND

A graphics pipeline is a software- and/or hardware-implemented function that converts a three-dimensional (3D) model data (e.g., utilized by a gaming, virtual reality, simulation, design and/or other application) to two-dimensional (2D) graphics data, which is suitable for displaying on one or more display devices.

DETAILED DESCRIPTION

Described herein are systems and methods for cross-platform graphics pipeline emulation.

In an illustrative example, cross-platform virtualization may involve running a virtual machine ("guest") on a host platform that is different from the guest platform (e.g., running Windows® applications on a MacOS® host). In various cross-platform virtualization implementations, the graphics frameworks employed by the two platforms may not be fully compatible. For example, various graphic frameworks, including Direct3D®, may implement at least some pipeline stages in hardware, thus off-loading the work from the central processing unit (CPU) to the graphics processing unit (GPU), which may result in significant performance improvements. "GPU" herein refers to a specialized electronic circuit designed to efficiently perform multiple parallel data processing operations, such as floating point arithmetic operations, which are usually utilized for image creation and processing (although various general purpose computing operations may also be performed on a GPU). Differences in GPU architectures and implementations employed by various hardware platforms may result in incompatibility of GPU-assisted graphics pipelines implemented by such platforms, thus hindering efficient implementations of cross-platform virtualization solutions.

The systems and methods of the present disclosure utilize cross-platform graphics pipeline emulation, thus enabling efficient implementations of cross-platform virtualization solutions. While the example implementations described herein are directed to emulating Direct3D® graphics pipelines using Metal® graphics framework, systems and methods of the present disclosure may be utilized for other graphics pipeline emulation using other graphics frameworks.

Various aspects of the above referenced methods and systems are described in detail herein below by way of examples, rather than by way of limitation.

Various graphic frameworks, including Direct3D, implement various pipeline stages in hardware, thus off-loading the work from the CPU to the GPU, which may result in significant performance improvements. A notable example of such stages is tessellation, which refers herein to a process of converting a low-detail surface (also referred to herein as "patch") defined by multiple polygons into a set of higher-detail primitives, which involves subdividing each input polygon into multiple objects (e.g., triangles, points and/or lines) based on a set of tessellation factors (which are represented by numeric values specifying how finely the domain should be tessellated) and the type of partitioning (which specifies the algorithm used to subdivide the patch). In certain implementations, tessellation may involve adding new points to faces and edges of the surfaces, moving some points of the surfaces to new positions, and connecting the resulting points.

Figure 1:
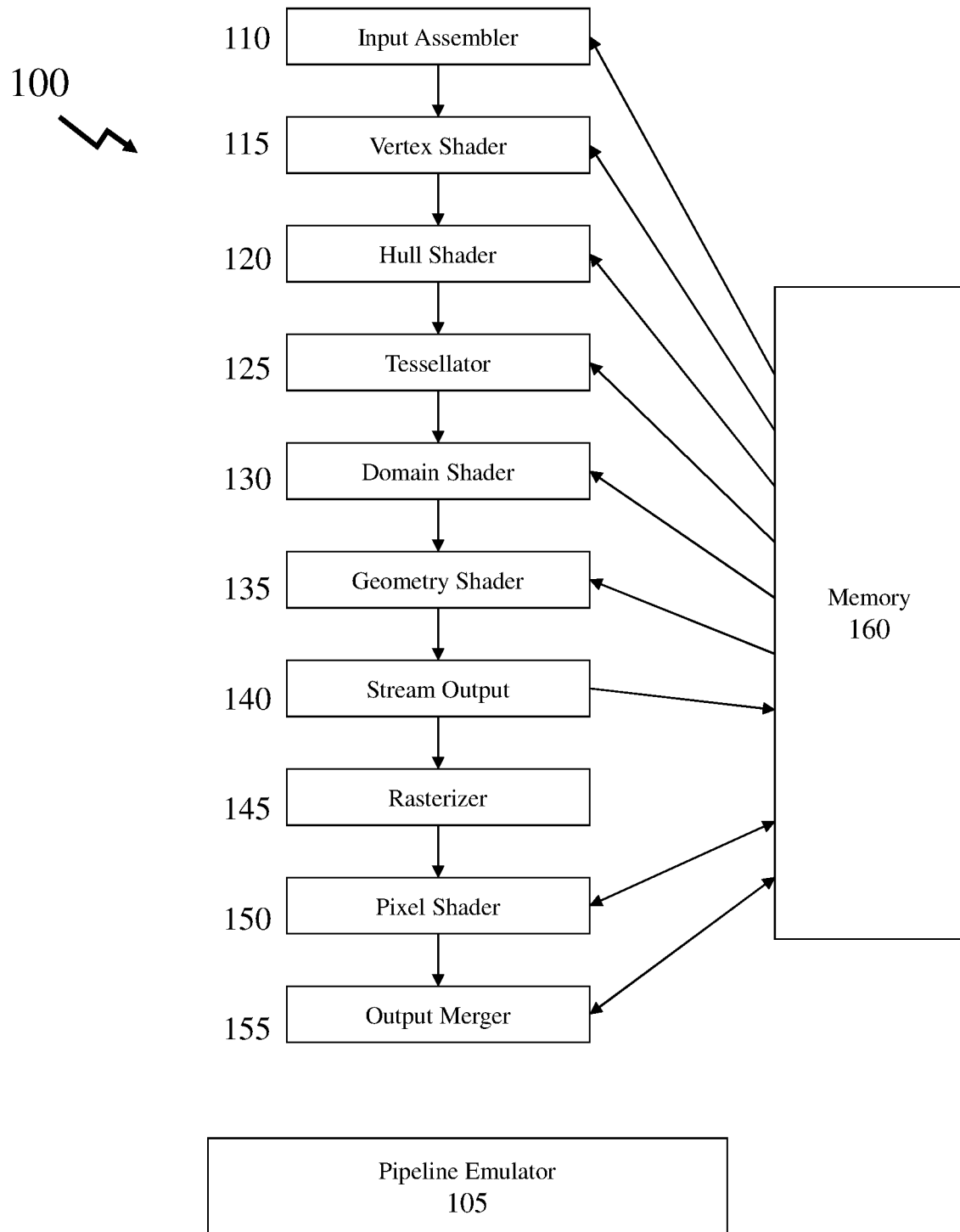
FIG. 1 schematically illustrates an example input graphics pipeline, which can be emulated by systems and methods of the present disclosure.

FIG. 1 schematically illustrates an example input graphics pipeline for cross-platform emulation in accordance with implementations of the present disclosure. As schematically illustrated by FIG. 1, the example graphics pipeline 100, which is fed to the graphics pipeline emulator 105, is a Direct3D® graphics pipeline comprising an input assembler 110, a vertex shader 115, a hull shader 120, a tessellator 125, a domain shader 130, a geometry shader 135, a stream output 140, a rasterizer 145, a pixel shader 150, and an output merger 155.

The input assembler 110 reads, from user-filled buffers residing in memory 160, the input primitive data defining primitives such as points, lines and/or triangles and assembles the input data into the primitives that will be used by other pipeline stages. The input assembler 110 feeds the resulting primitive data to the vertex shader 115.

The vertex shader 115 processes the vertices received from the input assembler 110 and performs per-vertex operations such as transformation, skinning, morphing, and/or lighting, thus producing a single output vertex for each input vertex. The vertex shader 115 feeds its output to the hull shader 120, which is the first stage of the three tessellation stages (which also include the tessellator 125 and the domain shader 130).

The tessellation stages convert low-detail surfaces into higher-detail primitives. In an illustrative example, tessellation involves adding a new point to each face (a "face point"). In some implementations, the face point is located at the average position of all points of the face.

Furthermore, tessellation may involve adding new points to each edge (an "edge point"). In some implementations, the edge point is located at the average position of the two points of the edge.

Furthermore, tessellation may involve moving some points to new positions (a "vertex point"). In some implementations, the vertex point is selected based on the number of edges connected to the control point.

Finally, tessellation may involve tessellation involves connecting the resulting points (i.e., face points, edge points, and vertex points).

The hull shader 120 is invoked once per patch to transform the input control points that define a low-order surface into output control points that make up a patch. The hull shader 120 operates in two phases: a control point phase and a patch constant phase, which are run in parallel by the hardware (e.g., the GPU). The control point phase operates once for each input control point, reading the input control point for the patch, and generating an output control point. The patch constant phase operates once per patch to generate edge tessellation factors and other per-patch constants. The tessellation factors determine the degree of subdividing the patch (e.g., how many objects should each domain (a quad, a triangle, or a line) be subdivided into). The control points and the patch constant data output from the hull shader 120 are fed to the domain shader 130. The tessellation factors are fed to the tessellator 125 and the domain shader 130.

The tessellator 125 operates once per patch and subdivides each domain (a quad, a triangle, or a line) into multiple smaller objects (triangles, points or lines) based on the tessellation factors and the type of partitioning (which specifies the algorithm used to subdivide the patch) that are received from the hull shader 120. The tessellator 125 outputs the UV coordinates and the surface topology to the domain shader 130.

The domain shader 130 processes the outputs of the hull shader 120 and the tessellator 125, including the control points, the patch constant data, and the tessellation factors, in order to generate the vertex positions of the control points in the output patch. The domain shader 130 completes the tessellation process, and the pipeline data is fed to the next pipeline stage (i.e., the geometry shader 135).

The geometry shader 135 is invoked once for every primitive (e.g., a single point, a line, or a triangle) that is received from the domain shader 130 and produces multiple vertices forming the selected topology (e.g., a tri-strip, a line strip, or a point list). The geometry shader 135 outputs the data by appending the generated vertices, one vertex at a time, and/or cutting primitives to an output stream object. The output of the geometry shader 135 is fed to the rasterizer 140 and/or to a vertex buffer residing in the memory 160 via the stream output stage 145.

The stream output stage 145 continuously outputs the vertex data produced by the geometry shader 135 (or the vertex shader 115 if the geometry shader 135 is inactive) to the vertex buffer. The data streamed out to the vertex buffer can be read back into the pipeline in a subsequent rendering operation, or can be read by the CPU.

The rasterizer 140 converts the vertex data produced by the geometry shader 135 into a raster image composed of multiple pixels, which is suitable for displaying. Rasterization involves clipping vertices to the viewing frustum, performing division by z (the depth coordinate) to provide perspective, mapping primitives to a 2D viewport, and determining how to invoke the pixel shader 150.

The pixel shader 150 combines the texture data, the interpolated per-vertex values, and other data to produce per-pixel outputs. The output merger 155, which is the final stage of the example graphic pipeline 100, generates the final rendered pixel color using a combination of the pipeline state, the pixel data generated by the pixel shaders, the contents of the render targets, and the contents of the depth/stencil buffers.

As noted herein above, graphics frameworks employed by different hardware platforms may not be fully compatible. For example, graphics frameworks may have different implementation of tessellation stage(s), which may necessitate CPU emulation of at least some of GPU-implemented graphic platform stages for enabling certain cross-platform virtualization scenarios.

In an illustrative example, cross-platform virtualization involves running Windows® applications on a MacOS® host, which would call for emulating Direct3D® graphics pipelines using Metal® graphics framework. Due to the differences in the two graphics frameworks, some Direct3D® graphics pipelines would not be executable by a single draw call to Metal® graphics framework. Such pipelines may, however, be executed by several stages using emulation methods described herein. In particular, each of tessellation, stream output, and geometry shaders may be implemented by several Metal-based compute or rendering stages, and temporary memory buffers may be employed for data transfer between the stages, as described in more detail herein below.

Figure 2:
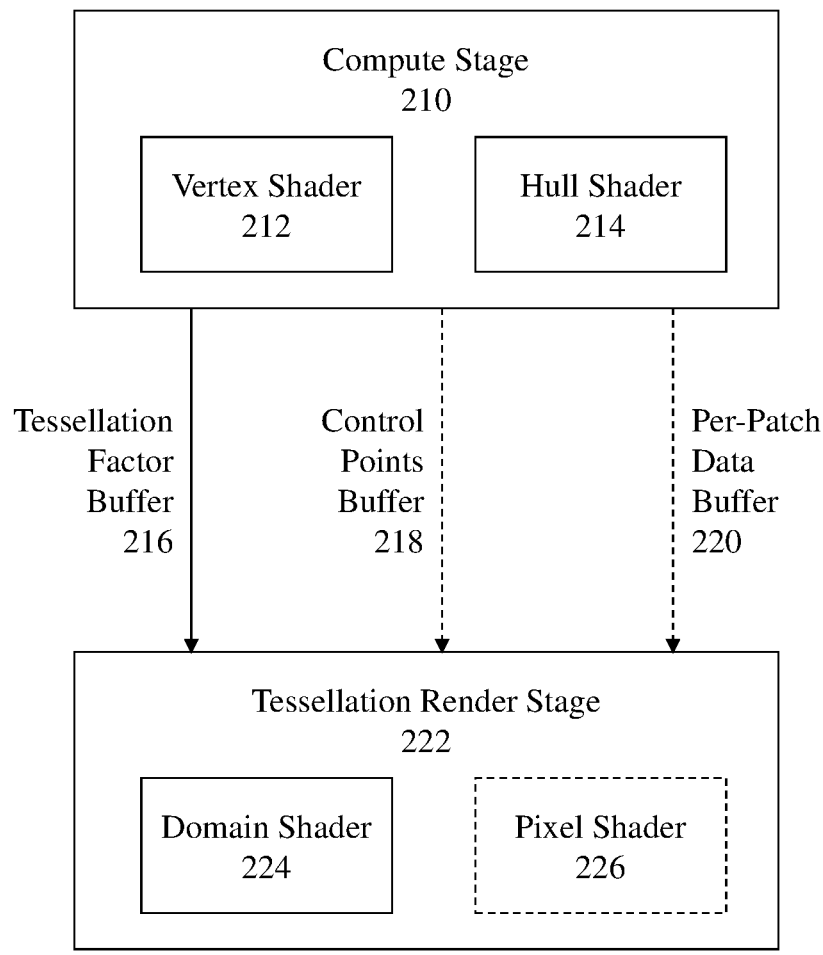
FIG. 2 schematically illustrates an example emulated pipeline executable on Metal® graphics framework.

Some Direct3D® graphics pipelines may be emulated using Metal® hardware-implemented tessellation while disabling the geometry shader and stream output of the input pipeline. FIG. 2 schematically illustrates an example emulated pipeline 200 executable on Metal® graphics framework. As shown in FIG. 2, the example emulated pipeline 200 includes a compute stage 210 and a tessellation render stage 222. The compute stage 210, which includes a vertex shader 212 and a hull shader 214, produces the following output buffers: a tessellation factor buffer 216, an optional control points buffer 218, and an optional per-patch data buffer 220. The tessellation render stage 222 includes a domain shader 224 and an optional pixel shader 226.

However, tessellation stage implementations of Metal® graphics framework have certain remarkable restrictions, including inability to support isoline tessellation (i.e., tessellation of sets of independent horizontal line segments, which are arranged into connected strips called isolines) and point generation, as well as lack of geometry shader and stream output stages. Accordingly, tessellation stages would need to be emulated for any input Direct3D® graphics pipeline that has at least one of the above-listed features.

One of the challenges in emulating tessellation stages is the very large number of vertices that need to be generated by the tessellator, which in the worst case scenario may lead to the requisite size of memory buffers for storing the generated vertices exceeding the available video memory size. The systems and methods of the present disclosure alleviate this challenge by splitting the tessellation input data into several blocks, allocating memory buffers, and performing the tessellation stages multiple times, such that each tessellation pass would process the respective block of the tessellation input data.

The amount of memory necessary for performing a tessellation operation on a known number of input points may be determined based on the tessellation type. In particular, for triangle and quad tessellation, the number of indices would not exceed six times the number of points, while for isoline tessellation, the number of indices would not exceed twice the number of points. Thus, the number of points that can be processed by a single pass may be determined based on the amount of the available memory, and the number of passes may be determined based on the number of points to be processed by a single pass, as described in more detail herein below.

Figure 3:
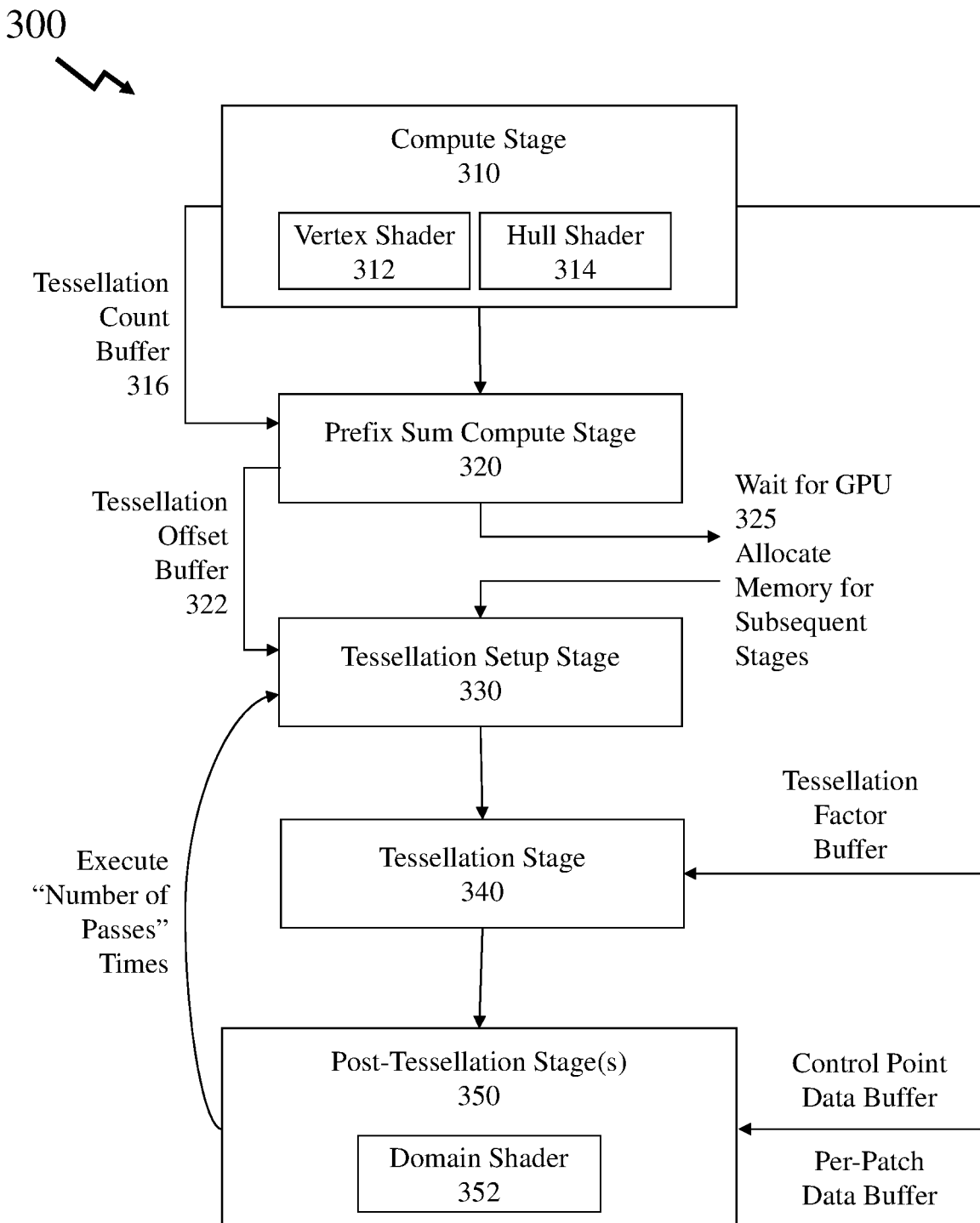
FIG. 3 schematically illustrates an example emulated Direct3D® pipeline using Metal® hardware-implemented tessellation.

FIG. 3 schematically illustrates an example emulated Direct3D® pipeline 300 using Metal® hardware-implemented tessellation. As shown in FIG. 3, the example emulated pipeline 300 includes the following stages: a compute stage 310, a prefix sum computation stage 320, a tessellation pass setup stage 330, a tessellation stage 340, and one or more post-tessellation stages 350 (e.g., a domain shader 352)).

The compute stage 310 emulates a vertex shader 312 and a hull shader 314. Similarly to native Direct3D® implementations, the vertex shader 312 processes the input vertices and performs per-vertex operations such as transformations, skinning, morphing, and/or lighting, thus producing a single output vertex for each input vertex. The vertex shader 312 feeds its output to the hull shader 314, which is invoked once per patch to transform the input control points that define a low-order surface into output control points that make up a patch. The hull shader 314 reads the input control points for the patch and generates output control points, as well as tessellation factors and other per-patch constants. The control points and the patch constant data produced by the hull shader 314 are fed to the prefix sum computation stage 320. The tessellation factors are fed to the tessellation stage 340 and the post-tessellation stage(s) 350.

In contrast to native Direct3D® implementations, the compute stage 310 also generates a tessellation count buffer 316, which contains information about per-patch numbers of points and indices (if the index buffer exists) that would be generated based on the computed tessellation factors. In an illustrative example, the number of elements in the tessellation count buffer 316 matches the number of patches, and each element contains the number of points (and, optionally, the number of indices) to be generated for the patch identified by the index of the element in the tessellation count buffer 316.

The tessellation count buffer 316 is fed to the prefix sum computation stage 320, which creates a tessellation offset buffer 322 in the video memory (e.g., residing on a video adapter). The tessellation offset buffer 322 contains offsets of points (and, optionally, offsets of indices) for all the patches. Accordingly, the i-th element of the tessellation offset buffer 322 would contain the sum of all elements up to (i−1)-th element of the tessellation count buffer 316:

$$TOB_i = \Sigma_{j=0}^{i-1} TCB_j$$

where $TOB_i$ denotes i-th element of the tessellation offset buffer 322, and denotes $TCB_j$ denotes j-th element of the tessellation count buffer 316.

Thus, the i-th element of the tessellation offset buffer 322 is the index of the first point of the i-th patch in the memory buffer storing the generated points.

The prefix sum computation stage 320 may compute a vector including the following components:

.x—the maximum number of points to be generated for a given patch (i.e., the patch identified by the index of the array element);

.y—the sum of offsets of points to be generated for the patch, and

.z—the sum of offsets of indices to be generated for the patch (if the index buffer exists).

The vector may be initialized, using the tessellation count buffer 316, as follows:

.x=the number of points,

.y=the number of points, and

.z=the number of indices.

The .x component is utilized for computing the resulting maximum number of points that may be generated for one patch. Accordingly, each element of the tessellation offset buffer 322 may be represented by a vector including the .y and optional .z components.

The summing operation may be defined, assuming that c.xyz=a.xyz+b.xyz, as follows:

$$c.x = \max(a.x, b.x),$$

$$c.y = a.y + b.y, \text{ and}$$

$$c.z = a.z + b.z.$$

The tessellation stage 340 and post-tessellation stages 350, which follow the prefix sum computation stage 320, are performed iteratively, such that each iteration processes a respective block of points specifying one or more patches, and the number of iterations is equal to the computed number of passes. Before each pass, an extra compute shader (i.e., the tessellation pass setup stage 330) is executed in a single thread, which initializes parameters for the subsequent stages, thus avoiding an additional data transfer from the GPU to the CPU. The compute shader 330 receives the pass number, the tessellation offset buffer 322 and the pass starting patch buffer. The compute shader 330 retrieves, from the pass starting patch buffer, the start patch number and the end patch number. Then, the numbers of points and indices for the identified patches are computed using the tessellation offset buffer 322.

As noted herein above, the tessellation input data into is split into several blocks, which are sequentially processed by the tessellation stage(s) 340, such that each tessellation pass would process the respective block of the tessellation input data. Initially, the number of points that can be processed by a single pass may be determined based on the amount of the available memory. Then, the number of passes may be determined based on the number of points to be processed by a single pass.

Accordingly, the input array (i.e., the tessellation count buffer 316) for the prefix sum computation stage 320 may be split into multiple blocks, such that the prefix sums may initially be computed within each block, then the per-block prefix sums may be aggregated to produce the prefix sum values, followed by calculating the final results within the block.

The last step effectively partitions the input data into multiple blocks, each of the blocks to be processed by the respective tessellation pass. Before performing each pass, the pass step is computed as follows:

PassStep=MaxPoints−MaxPointsPerPatch+1, where PassStep denotes the number of points to be processed by the next pass, MaxPoints is the maximum number of points that may be processed by one pass, and MaxPointsPerPatch is the maximum number of points to be generated by patch, equal to the first component (.x) of the computed prefix sum.

The computed value of PassStep is then used for data partitioning. The partition information (i.e., the number of the starting patch for the given block) is stored in the pass starting patch buffer (not shown in FIG. 3). The number of elements in this buffer is equal to the number of input patches incremented by one, since a block must include at least one patch. Accordingly, the current block would include a given patch provided that:

Floor(number of points without the given patch/pass step)<floor(number of points including the given patch/pass step), where Floor(x) returns the largest integer value less than or equal to x.

The computed numbers are then transferred from the GPU to the CPU, which would utilize the numbers for allocating the requisite memory buffers (operation 325).

The tessellation stage 340, which is running on the GPU, reads the tessellation factors and generates an array of structures containing barycentric coordinates of the output vertices organized by patches. The generated structures are stored in a temporary memory buffer.

Implementations of the post-tessellation stages 350, such as the domain shader 352, depend on the structure of the input graphics pipeline. In particular, if the input graphics pipeline does not include a geometry shader and a stream output stage, the domain shader 352 may be implemented as a graphics stage without tessellation. Conversely, if the input graphics pipeline does include a geometry shader and stream output stage, the domain shader 352 may be implemented as a compute stage. Following the domain shader, the geometry shader, stream output stage and the pixel shader (not shown in FIG. 1) may optionally be executed.

The vertex data produced by the pipeline 300 may be transformed into a raster image composed of multiple pixels, which is suitable for displaying. The rasterization operations performed on the vertex data may include clipping vertices to the viewing frustum, performing division by z (the depth coordinate) to provide perspective, and/or mapping primitives to a 2D viewport. The raster image may be displayed using one or more display devices.

Figure 4:
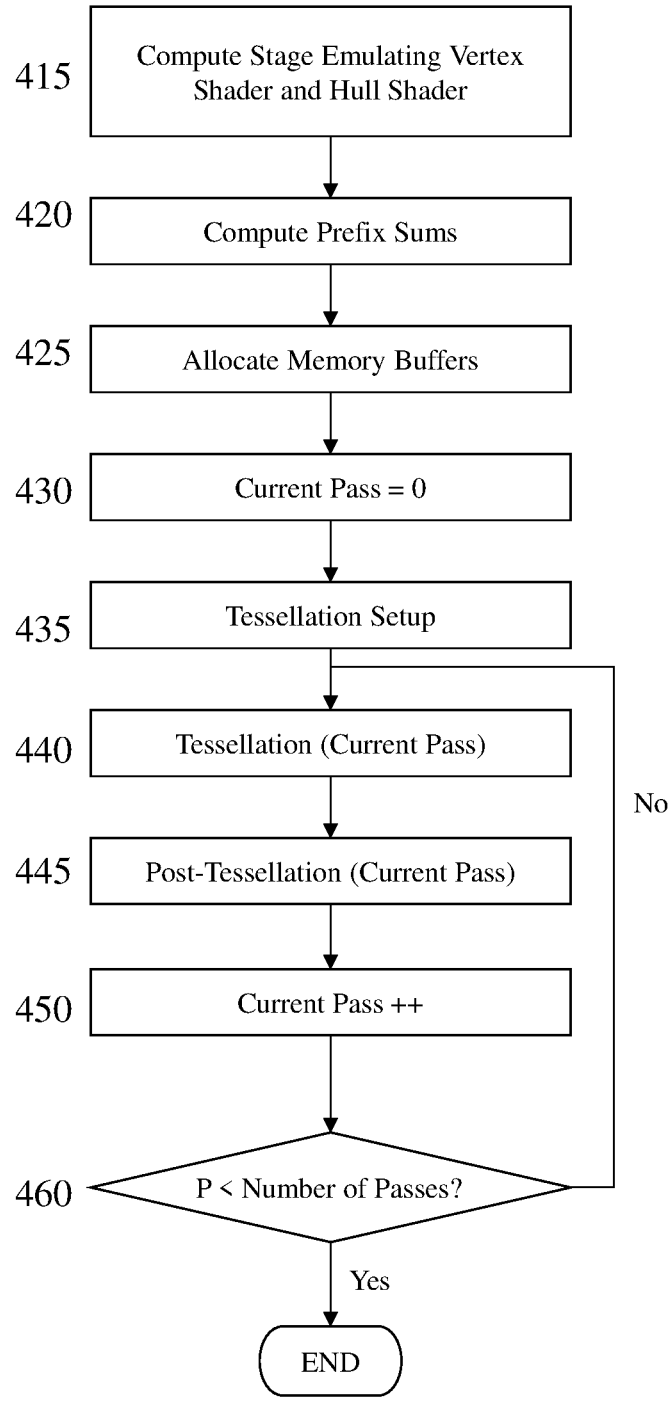
FIG. 4 depicts a flowchart of an example method of hardware-assisted graphics pipeline emulation, in accordance with one or more aspects of the present disclosure.

FIG. 4 depicts a flowchart of an example method of hardware-assisted graphics pipeline emulation, in accordance with one or more aspects of the present disclosure. Method 400 and/or each of its individual functions, routines, subroutines, or operations may be performed by one or more processors of the computer system (e.g., the example computer system 1000 of FIG. 5) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At operation 415, a GPU of the computer system performs a compute stage to emulate a vertex shader and a hull shader. The vertex shader processes the input vertices and performs per-vertex operations such as transformations, skinning, morphing, and/or lighting, thus producing a single output vertex for each input vertex. The hull shader transforms the input control points that define a low-order surface into output control points that make up a patch. The hull shader further produces a set of tessellation factors and other per-patch constants. The compute stage 310 also generates a tessellation count buffer, which contains information about per-patch numbers of points and indices (if the index buffer exists) that would be generated based on the computed tessellation factors, as described in more detail herein above.

At operation 420, the GPU of the computer system computes prefix sums based on the tessellation count buffer, thus generating a tessellation offset buffer, which contains offsets of points (and, optionally, offsets of indices) for all the patches. Furthermore, the number of points that can be processed by a single pass is determined based on the amount of the available memory, and the number of passes is determined based on the number of points to be processed by a single pass, as described in more detail herein above.

At operation 425, a CPU of the computer system allocates the requisite memory buffers for the subsequent stages, based on the results produced by the compute operations 415-420.

At operation 430, the CPU of the computer system initializes a variable storing the current pass number and transfers its value to the GPU.

At operation 435, the GPU of the computer system performs tessellation setup to initialize parameters for the subsequent stages, thus avoiding an additional data transfer from the GPU to the CPU. The tessellation setup operation 435 receives the current pass number, the tessellation offset buffer and the pass starting patch buffer produced by the prefix sum computation operation 420. The tessellation setup operation 435 retrieves, from the pass starting patch buffer, the start patch number and the end patch number. Then, the numbers of points and indices for the identified patches are computed using the tessellation offset buffer and parameters for the subsequent stages are initialized, as described in more detail herein above.

At operation 440, the GPU of the computer system performed the tessellation stage, which reads the tessellation factors and generates an array of structures containing the barycentric coordinates of the output vertices organized by patches, as described in more detail herein above.

At operation 445, the GPU of the computer system performs one or more post-tessellation operations, such as a domain shader, a geometry shader, and/or a pixel shader, as described in more detail herein above.

At operation 450, the CPU of the computer system increments the variable storing the current pass number.

Responsive to determining, at operation 455, that the current pass number is less than the number of passes, the method loops back to operation 435; otherwise, the method terminates.

Figure 5:
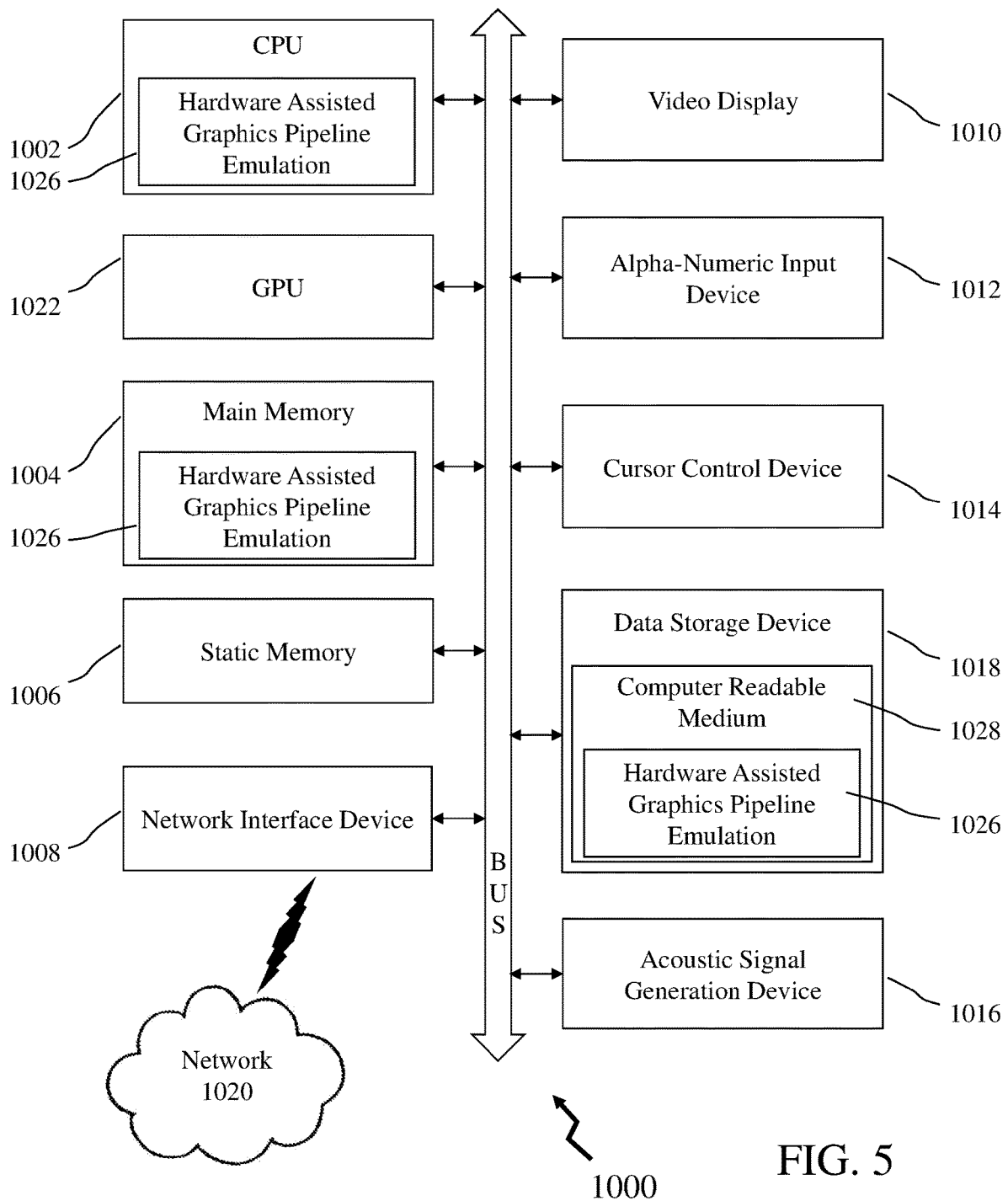
FIG. 5 schematically illustrates a component diagram of an example computer system which may perform the methods described herein.

FIG. 5 schematically illustrates a component diagram of an example computer system 1000 which may perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a central processing unit (CPU) 1002 (also referred to as a processor), a graphics processing unit (GPU) 1022, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

CPU 002 represents one or more general-purpose processing devices such as a microprocessor, central processing unit, or the like. More particularly, CPU 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets.

CPU 1002 and/or GPU 1022 may be employed to execute instructions implementing method 400 of hardware-assisted graphics pipeline emulation, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. Executable instructions 1026 may comprise executable instructions encoding various functions of method 400 of hardware-assisted graphics pipeline emulation, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
one or more processors; and
one or more memories for storing computer executable instructions for execution by the one or more processors and storing data; wherein
the computer executable instructions when executed by the one or more processors configure the system to execute a process forming part of a graphics processing pipeline comprising the steps of:
retrieving from another memory input primitive data defining primitives to be processed by a tessellation process;
generating from the primitive data an input set of graphic primitives to be processed by the tessellation process;
computing, based on an input set of graphic primitives, a set of tessellation factors and a set of points specifying a plurality of patches to be processed by the tessellation process;
determining an amount of available memory of the one or memories and the another memory reserved for the tessellation process;
determining a number of points that can be processed in a single pass of the tessellation process in dependence upon the amount of available memory;
determining a number of passes of the tessellation process to be performed to process the set of points in dependence upon the number of points within the set of points to be processed and the determined number of points that can be processed in a single pass; and
executing the determined number of passes of the tessellation process.

2. The system according to claim 1, wherein
the computer executable instructions when executed by the one or more processors configure the system to execute another process comprising the steps of:
computing, based on the set of points, a tessellation count buffer; and
generating prefix sums and a pass starting patch buffer comprising start patch numbers and end patch numbers based upon the set of points and the tessellation count buffer which contains offsets of points for the plurality of patches; and
each pass of the tessellation process comprises:
performing a tessellation setup stage for a current set of patches within a current pass in dependence upon the current pass number, the tessellation offset buffer and the pass starting patch buffer produced when generating the prefix sums; and
performing a tessellation stage based on the set of tessellation factors for the current set of patches within the current pass, wherein the tessellation stage generates a plurality of output points corresponding to one or more patches of the plurality of patches.

3. The system according to claim 2, wherein
at least one of:
the tessellation setup operation retrieves from a pass starting buffer a start patch number and an end patch number and computes the number of points and indices for the identified patches using the tessellation offset buffer; and
performing the tessellation stage generates an array of structures containing barycentric coordinates of the output vertices organized by the patches within the current set of patches for the current pass.

4. The system according to claim 2, wherein
the one of more processors comprises at least a pair of processors where a first processor of the pair of processors is a graphics processing unit (GPU) and a second processor of the pair of the processors is a central processing unit (CPU);
the tessellation process is performed by the GPU whilst the CPU executes a subset of the graphics processing pipeline;
a compute shader forming part of the graphics processing pipeline is executed in a single thread prior to each pass of the tessellation process; and
the compute shader initializes parameters for the tessellation setup stage and tessellation stage thereby avoiding additional data transfer from the GPU to the CPU and the compute shader retrieves from the pass starting patch buffer the start patch number and end patch numbers such that the number of points and indices of the patches of the plurality of patches for the current pass can be computed using the tessellation output buffer.

5. The system according to claim 2, wherein
generating the prefix sums comprises:
splitting the tessellation count buffer into multiple blocks, the number of blocks defined by the number of passes and each block associated with a single pass of the number of passes;
computing initial prefix sums for each block of the multiple blocks; and
aggregating the initial prefix sums to produce the prefix sums.

6. The system according to claim 1, wherein
the computer executable instructions when executed by the one or more processors configure the system to execute another process comprising the steps of:
computing, based on the set of points, a tessellation count buffer; and
generating prefix sums and a pass starting patch buffer comprising start patch numbers and end patch numbers based upon the set of points and the tessellation count buffer which contains offsets of points for the plurality of patches;
each pass of the tessellation process comprises at least performing a tessellation setup stage for a current set of patches within a current pass in dependence upon the current pass number, the tessellation offset buffer and the pass starting patch buffer produced when generating the prefix sums; and
either:
generating the prefix sums based upon the set of points specifying the plurality of patches comprises computing a vector for each patch of the plurality of patches comprising:
an x component comprising a maximum number of points to be generated for the patch of the plurality of patches;
a y component comprising a sum of offsets of points to be generated for the patch of the plurality of patches; and
a z component comprising a sum of offsets of indices to be generated for the patch of the plurality of patches;
or:
generating the prefix sums based upon the set of points specifying the plurality of patches comprises computing a vector for each patch of the plurality of patches comprising:

an x component comprising a maximum number of points to be generated for the patch of the plurality of patches; and a y component comprising a sum of offsets of points to be generated for the patch of the plurality of patches.

7. The system according to claim 1, wherein
the one of more processors comprises at least a pair of processors where a first processor of the pair of processors is a graphics processing unit (GPU) and a second processor of the pair of the processors is a central processing unit (CPU);
the tessellation process is performed by the GPU whilst the CPU executes a subset of the graphics processing pipeline; and
a compute shader forming part of the graphics processing pipeline is executed in a single thread prior to each pass of the tessellation process to initialize parameters for that pass of the tessellation process thereby avoiding additional data transfer from the GPU to the CPU.

8. A non-transitory computer readable medium storing thereon computer executable instructions which when executed by one or more processors configure the one or more processors to execute a process forming part of a graphics processing pipeline comprising the steps of:
retrieving from a memory input primitive data defining primitives to be processed by a tessellation process;
generating from the primitive data an input set of graphic primitives to be processed by the tessellation process;
computing, based on an input set of graphic primitives, a set of tessellation factors and a set of points specifying a plurality of patches to be processed by the tessellation process;
determining an amount of available memory of the memory reserved for the tessellation process;
determining, a number of points that can be processed in a single pass of the tessellation process in dependence upon the amount of available memory;
determining a number of passes of the tessellation process to be performed to process the set of points in dependence upon the number of points within the set of points to be processed and the determined number of points that can be processed in a single pass; and
executing the determined number of passes of the tessellation process.

9. The non-transitory computer readable medium according to claim 8, wherein
the computer executable instructions when executed by the one or more processors further configure the one or more processors to execute another process comprising the steps of:
computing, based on the set of points, a tessellation count buffer; and
generating prefix sums and a pass starting patch buffer comprising start patch numbers and end patch numbers based upon the set of points and the tessellation count buffer which contains offsets of points for the plurality of patches; and
each pass of the tessellation process comprises:
performing a tessellation setup stage for a current set of patches within a current pass in dependence upon the current pass number, the tessellation offset buffer and the pass starting patch buffer produced when generating the prefix sums; and
performing a tessellation stage based on the set of tessellation factors for the current set of patches within the current pass, wherein the tessellation stage generates a plurality of output points corresponding to one or more patches of the plurality of patches.

10. The non-transitory computer readable medium according to claim 9, wherein at least one of:
the tessellation setup operation retrieves from a pass starting buffer a start patch number and an end patch number and computes the number of points and indices for the identified patches using the tessellation offset buffer; and
performing the tessellation stage generates an array of structures containing barycentric coordinates of the output vertices organized by the patches within the current set of patches for the current pass.

11. The non-transitory computer readable medium according to claim 9, wherein
the one of more processors comprises at least a pair of processors where a first processor of the pair of processors is a graphics processing unit (GPU) and a second processor of the pair of the processors is a central processing unit (CPU);
the tessellation process is performed by the GPU whilst the CPU executes a subset of the graphics processing pipeline;
a compute shader forming part of the graphics processing pipeline is executed in a single thread prior to each pass of the tessellation process; and
the compute shader initializes parameters for the tessellation setup stage and tessellation stage thereby avoiding additional data transfer from the GPU to the CPU and the compute shader retrieves from the pass starting patch buffer the start patch number and end patch numbers such that the number of points and indices of the patches of the plurality of patches for the current pass can be computed using the tessellation output buffer.

12. The non-transitory computer readable medium according to claim 9, wherein
generating the prefix sums comprises:
splitting the tessellation count buffer into multiple blocks, the number of blocks defined by the number of passes and each block associated with a single pass of the number of passes;
computing initial prefix sums for each block of the multiple blocks; and
aggregating the initial prefix sums to produce the prefix sums.

13. The non-transitory computer readable medium according to claim 8, wherein
the computer executable instructions when executed by the one or more processors configure the one or more processors to execute another process comprising the steps of:
computing, based on the set of points, a tessellation count buffer; and
generating prefix sums and a pass starting patch buffer comprising start patch numbers and end patch numbers based upon the set of points and the tessellation count buffer which contains offsets of points for the plurality of patches;
each pass of the tessellation process comprises at least performing a tessellation setup stage for a current set of patches within a current pass in dependence upon the current pass number, the tessellation offset buffer and the pass starting patch buffer produced when generating the prefix sums; and either:
  generating the prefix sums based upon the set of points specifying the plurality of patches comprises computing a vector for each patch of the plurality of patches comprising:
    an x component comprising a maximum number of points to be generated for the patch of the plurality of patches;
    a y component comprising a sum of offsets of points to be generated for the patch of the plurality of patches; and
    a z component comprising a sum of offsets of indices to be generated for the patch of the plurality of patches;
  or:
  generating the prefix sums based upon the set of points specifying the plurality of patches comprises computing a vector for each patch of the plurality of patches comprising:
    an x component comprising a maximum number of points to be generated for the patch of the plurality of patches; and
    a y component comprising a sum of offsets of points to be generated for the patch of the plurality of patches.

14. The non-transitory computer readable medium according to claim 8, wherein
  the one of more processors comprises at least a pair of processors where a first processor of the pair of processors is a graphics processing unit (GPU) and a second processor of the pair of the processors is a central processing unit (CPU);
  the tessellation process is performed by the GPU whilst the CPU executes a subset of the graphics processing pipeline; and
  a compute shader forming part of the graphics processing pipeline is executed in a single thread prior to each pass of the tessellation process to initialize parameters for that pass of the tessellation process thereby avoiding additional data transfer from the GPU to the CPU.

15. A method comprising:
  retrieving from a memory input primitive data defining primitives to be processed by a tessellation process;
  generating from the primitive data an input set of graphic primitives to be processed by the tessellation process;
  computing, based on an input set of graphic primitives, a set of tessellation factors and a set of points specifying a plurality of patches to be processed by the tessellation process;
  determining an amount of available memory of the memory reserved for the tessellation process;
  determining, a number of points that can be processed in a single pass of the tessellation process in dependence upon the amount of available memory;
  determining a number of passes of the tessellation process to be performed to process the set of points in dependence upon the number of points within the set of points to be processed and the determined number of points that can be processed in a single pass; and
  executing the determined number of passes of the tessellation process.

16. The method according to claim 15, further comprising:
  computing, based on the set of points, a tessellation count buffer; and
  generating prefix sums and a pass starting patch buffer comprising start patch numbers and end patch numbers based upon the set of points and the tessellation count buffer which contains offsets of points for the plurality of patches; and
  each pass of the tessellation process comprises:
    performing a tessellation setup stage for a current set of patches within a current pass in dependence upon the current pass number, the tessellation offset buffer and the pass starting patch buffer produced when generating the prefix sums; and
    performing a tessellation stage based on the set of tessellation factors for the current set of patches within the current pass, wherein the tessellation stage generates a plurality of output points corresponding to one or more patches of the plurality of patches.

17. The method according to claim 16, wherein
  at least one of:
    the tessellation setup operation retrieves from a pass starting buffer a start patch number and an end patch number and computes the number of points and indices for the identified patches using the tessellation offset buffer; and
    performing the tessellation stage generates an array of structures containing barycentric coordinates of the output vertices organized by the patches within the current set of patches for the current pass.

18. The method according to claim 16, wherein
  one or more processors comprises at least a pair of processors where a first processor of the pair of processors is a graphics processing unit (GPU) and a second processor of the pair of the processors is a central processing unit (CPU);
  the tessellation process is performed by the GPU whilst the CPU executes a subset of the graphics processing pipeline;
  a compute shader forming part of the graphics processing pipeline is executed in a single thread prior to each pass of the tessellation process; and
  the compute shader initializes parameters for the tessellation setup stage and tessellation stage thereby avoiding additional data transfer from the GPU to the CPU and the compute shader retrieves from the pass starting patch buffer the start patch number and end patch numbers such that the number of points and indices of the patches of the plurality of patches for the current pass can be computed using the tessellation output buffer.

19. The method according to claim 16, wherein
  generating the prefix sums comprises:
    splitting the tessellation count buffer into multiple blocks, the number of blocks defined by the number of passes and each block associated with a single pass of the number of passes;
    computing initial prefix sums for each block of the multiple blocks; and
    aggregating the initial prefix sums to produce the prefix sums.

20. The method according to claim 15, further comprising:
  computing, based on the set of points, a tessellation count buffer; and
  generating prefix sums and a pass starting patch buffer comprising start patch numbers and end patch numbers based upon the set of points and the tessellation count buffer which contains offsets of points for the plurality of patches;
  each pass of the tessellation process comprises at least performing a tessellation setup stage for a current set of patches within a current pass in dependence upon the current pass number, the tessellation offset buffer and the pass starting patch buffer produced when generating the prefix sums; and either:
- generating the prefix sums based upon the set of points specifying the plurality of patches comprises computing a vector for each patch of the plurality of patches comprising:
  - an x component comprising a maximum number of points to be generated for the patch of the plurality of patches;
  - a y component comprising a sum of offsets of points to be generated for the patch of the plurality of patches; and
  - a z component comprising a sum of offsets of indices to be generated for the patch of the plurality of patches;

or:
- generating the prefix sums based upon the set of points specifying the plurality of patches comprises computing a vector for each patch of the plurality of patches comprising:
  - an x component comprising a maximum number of points to be generated for the patch of the plurality of patches; and
  - a y component comprising a sum of offsets of points to be generated for the patch of the plurality of patches.

21. The method according to claim 15, wherein one or more processors comprises at least a pair of processors where a first processor of the pair of processors is a graphics processing unit (GPU) and a second processor of the pair of the processors is a central processing unit (CPU);

the tessellation process is performed by the GPU whilst the CPU executes a subset of the graphics processing pipeline; and a compute shader forming part of the graphics processing pipeline is executed in a single thread prior to each pass of the tessellation process to initialize parameters for that pass of the tessellation process thereby avoiding additional data transfer from the GPU to the CPU.

* * * * *